(12) United States Patent
Grabbe (10) Patent No.: US 6,695,488 B2
(45) Date of Patent: Feb. 24, 2004

(54) TOOL AND METHOD FOR FORMING A MULTI FIBER FERRULE

(75) Inventor: Dimitry G. Grabbe, Middletown, PA (US)

(73) Assignee: Cinch Connectors, Inc., Lombard, IL (US)

( * ) Notice: Subject to any disclaimer, the term of this patent is extended or adjusted under 35 U.S.C. 154(b) by 0 days.

(21) Appl. No.: 09/908,991

(22) Filed: Jul. 19, 2001

(65) Prior Publication Data

US 2003/0016918 A1 Jan. 23, 2003

(51) Int. Cl.[7] .................................. G02B 6/36
(52) U.S. Cl. .............................. 385/78; 385/77
(58) Field of Search ........................ 385/78, 77, 98, 385/114, 52–59; 439/874

(56) References Cited

U.S. PATENT DOCUMENTS

| | | | |
|---|---|---|---|
| 2,544,915 A | 3/1951 | Cameron | 228/151 |
| 3,864,018 A | 2/1975 | Miller | 385/98 |
| 4,029,390 A | 6/1977 | Chinnock et al. | 385/98 |
| 4,046,454 A | 9/1977 | Pugh, III | 385/59 |

(List continued on next page.)

FOREIGN PATENT DOCUMENTS

| | | | |
|---|---|---|---|
| EP | 0 410 181 A2 | 7/1990 | G02B/6/38 |
| EP | 1 098 213 A1 | 11/1999 | G02B/6/36 |
| JP | 64-35509 | 2/1989 | |
| JP | 2-146510 | 6/1990 | |
| JP | 05134146 | 5/1993 | |
| JP | 7-159652 | 6/1995 | |
| JP | 8-179161 | 7/1996 | |
| JP | 9-68627 | 3/1997 | |
| JP | 63-55507 | 3/1998 | |
| WO | WO 00/72070 | 5/2000 | G02B/6/38 |

*Primary Examiner*—Michael C. Zarroli
(74) *Attorney, Agent, or Firm*—Leydig, Voit & Mayer, Ltd.

(57) ABSTRACT

The present invention provides a multi fiber optical ferrule, a tool for forming the ferrule, and a method of making the ferrule. The multi fiber optical ferrule is formed of two ferrule halves which are either molded or cast as imprecise blanks which are machined using a broach in order to precisely cut inner surfaces thereof for receiving an array of fibers. The inner surfaces of a pair of ferrule halves are cut simultaneously in order to assure accuracy in the fiber receiving and pin receiving channels. The halves are joined together with a fiber array placed therebetween to form the ferrule.

40 Claims, 8 Drawing Sheets

U.S. PATENT DOCUMENTS

| | | | | |
|---|---|---|---|---|
| 4,279,468 | A | 7/1981 | Turley et al. | 385/59 |
| 4,475,790 | A | 10/1984 | Little | 385/137 |
| 4,657,341 | A | 4/1987 | Sammueller | 385/59 |
| 4,725,114 | A | 2/1988 | Murphy | 385/59 |
| 4,784,460 | A | 11/1988 | Khoe | 385/71 |
| 4,818,058 | A | 4/1989 | Bonanni | 385/71 |
| 4,818,059 | A | 4/1989 | Kakii et al. | 385/65 |
| 4,830,456 | A | 5/1989 | Kakii et al. | 385/75 |
| 4,836,638 | A | 6/1989 | Finzel | 385/59 |
| 4,865,413 | A | 9/1989 | Hubner et al. | 385/71 |
| 4,898,449 | A | 2/1990 | Vroomen et al. | 385/56 |
| 4,921,325 | A | 5/1990 | Iri et al. | 385/53 |
| 4,973,127 | A | 11/1990 | Cannon, Jr. et al. | 385/56 |
| 4,983,012 | A | 1/1991 | Saito et al. | 385/56 |
| 5,037,179 | A | 8/1991 | Bortolin et al. | 385/54 |
| 5,044,711 | A | 9/1991 | Saito | 350/96.2 |
| 5,151,964 | A | 9/1992 | Carpenter et al. | 385/98 |
| 5,155,781 | A | 10/1992 | Doss et al. | 385/71 |
| 5,155,787 | A | 10/1992 | Carpenter et al. | 385/98 |
| 5,170,456 | A * | 12/1992 | Itoh et al. | 385/96 |
| 5,222,179 | A | 6/1993 | Auteri | 385/114 |
| 5,315,678 | A | 5/1994 | Maekawa et al. | 385/59 |
| 5,339,376 | A | 8/1994 | Kakii et al. | 385/71 |
| 5,351,328 | A | 9/1994 | Kakii et al. | 385/83 |
| 5,367,598 | A | 11/1994 | Devenish, III et al. | 385/135 |
| 5,379,361 | A | 1/1995 | Maekawa et al. | 385/65 |
| 5,434,939 | A | 7/1995 | Matsuda | 385/88 |
| 5,548,677 | A | 8/1996 | Kakii et al. | 385/92 |
| 5,561,731 | A | 10/1996 | Cooke et al. | 385/114 |
| 5,574,817 | A | 11/1996 | Henson et al. | 385/114 |
| 5,604,834 | A | 2/1997 | Beasley, Jr. et al. | 385/114 |
| 5,613,024 | A | 3/1997 | Shahid | 385/52 |
| 5,742,720 | A | 4/1998 | Kobayashi et al. | 385/89 |
| 5,778,126 | A | 7/1998 | Saitoh | 385/84 |
| 5,780,079 | A | 7/1998 | Lee | 425/577 |
| 5,786,002 | A | 7/1998 | Dean et al. | 425/183 |
| 5,815,621 | A | 9/1998 | Sakai et al. | 385/80 |
| 6,035,088 | A | 3/2000 | Chandraiah et al. | 385/114 |
| 6,045,269 | A | 4/2000 | Watanabe et al. | 385/59 |
| 6,045,270 | A | 4/2000 | Weiss et al. | 385/59 |
| 6,074,577 | A | 6/2000 | Katsura et al. | 264/1.25 |
| 6,074,579 | A | 6/2000 | Greshes | 264/1.7 |
| 6,205,278 | B1 | 3/2001 | Sjolinder | 385/114 |
| 6,232,556 | B1 * | 5/2001 | Daugherty et al. | 174/88 R |
| 6,287,017 | B1 | 9/2001 | Katsura et al. | 385/59 |
| 6,364,539 | B1 * | 4/2002 | Shahid | 385/83 |
| 6,398,424 | B1 | 6/2002 | Jin et al. | 385/83 |

* cited by examiner

TOOL AND METHOD FOR FORMING A MULTI FIBER FERRULE

FIELD OF THE INVENTION

The invention relates to a multi fiber optical ferrule, a tool for forming the multi fiber optical ferrule and a method of making the multi fiber optical ferrule.

BACKGROUND OF THE INVENTION

The demands placed on local area networks and wide area networks require an ever-increasing capability to handle more data flowing at faster data rates. Optical networks utilizing optical communication equipment are utilized to address this need. Such optical networks include optical switches having greater numbers of lines in and out in order to accommodate the increased data traffic. For example, current optical switches may have an input/output relationship as little as 512 by 512 and may be expanded to be greater than 2,000 by 2,000. Individual fibers for such an input/output arrangement are impractical, so ribbon fiber cable assemblies have been developed to address the greater density of inputs and outputs in these applications. These ribbon fiber arrangements require optical array connectors for interconnection to optical switches and other optical equipment within the network.

One such connector has been developed by the MT-RJ Alliance including the companies of Hewlett-Packard, Fujikura, AMP, Siecor, and USconec. The MT-RJ connector family utilizes an MT ferrule designed to hold 2, 4, 8, 12, or 16 fibers in a linear array. The MT ferrule is a precision molded solid part having tapered fiber receiving passageways which are loaded with a ribbon fiber array from a rear end. In line with the fiber array are a pair of pin receiving holes which are used to align the ferrule end faces of two mated ferrules. The pin holes must be precisely located with respect to the array of fiber receiving channels in order to insure proper alignment and minimize optical signal attenuation between mated fiber end faces. The ribbon is, secured into the ferrule with epoxy introduced through a transverse window formed in the ferrule. Once the epoxy is cured, the fibers are cleaved and polished at the front end or mating face to complete the ferrule and fiber array assembly. The ferrule and fiber array assembly may then be loaded into a variety of connector housings which are part of the MT-RJ or other connector systems.

It is important to maintain positional accuracy and alignment between the fiber array and pins so that upon mating with another ferrule, the end faces of the fibers are in alignment with each other to minimize coupling loss or attenuation at the interface. Unfortunately, since these ferrules are molded of plastic, they are not very stable and suffer from variation in material characteristics from one batch to another. Temperature history storage causes the positional accuracy of the optical fibers and pins to be compromised during storage and thermal cycling. Additionally, since these ferrules are designed to have tapered channels into which the fibers and epoxy are inserted, they must have sufficient clearance so that the fiber coated with epoxy will fit. This clearance results in some uncertainty as to where the fiber is located in relation to adjacent fibers in the array and in relation to the pins. This uncertainty results in a non-coaxial relationship between fiber cores in a mated pair of ferrules. Considering that the working core of a fiber is only a few microns in diameter, the positional tolerance is very small and large amounts of attenuation can be experienced with little positional uncertainty.

SUMMARY

It is therefore an object of the present invention to provide a multi fiber ferrule having improved positional accuracy and reduced coupling loss, and to provide a tool and method for making the ferrule. It is further desirable to produce a new and improved multi part fiber ribbon cable connector whose outer dimensions make it a direct replacement for the MT ferrule requiring no modifications to the MT-RJ connector housing.

This and other objects are achieved by providing an array ferrule made from two halves. Each half may be cast or molded from ceramic, glass, plastic, or metal material. The halves are machined by a skiving or broaching method utilizing a broach tool. The broach has an exposed cutting edge for broaching the inner contour of each ferrule half. The ferrule halves are preferably identical having inner faces which are a mirror image of each other. The inner surfaces and channels are machined with the same tool, assuring coaxiality of mating fibers with an error only due to uncertainty of fiber core to fiber outer diameter relationship.

BRIEF DESCRIPTION OF THE DRAWINGS

The invention will now be described by way of example with reference to the accompanying figures of which.

DETAILED DESCRIPTION OF THE INVENTION

Figure 1:
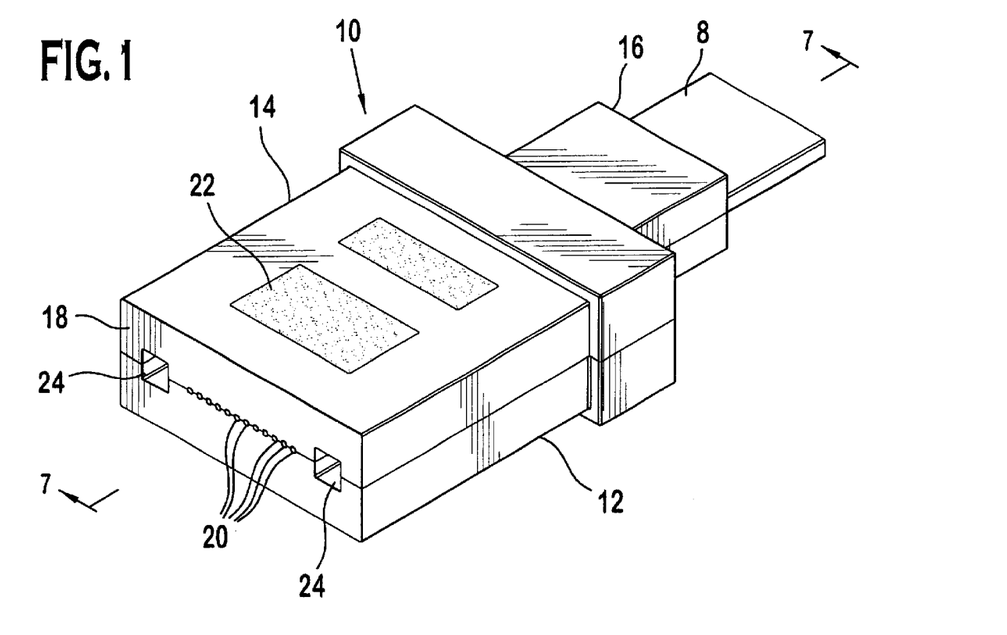
FIG. 1 is a perspective view of a fiber ferrule.

The invention will first be described generally with reference to FIG. 1. A multi fiber ferrule 10 according to the present invention is formed of first and second ferrule halves 12, 14. The first and second ferrule halves 12, 14 are joined together and receive a ribbon fiber cable 8 from a cable receiving end 16. The individual fibers of the ribbon cable 8 are positioned along a mating face 18 in a linear array located between a pair of pin receiving passageways 24. Windows 22 are provided for receiving an epoxy to secure the ribbon fiber cable 8 within the ferrule 10.

Figure 2:
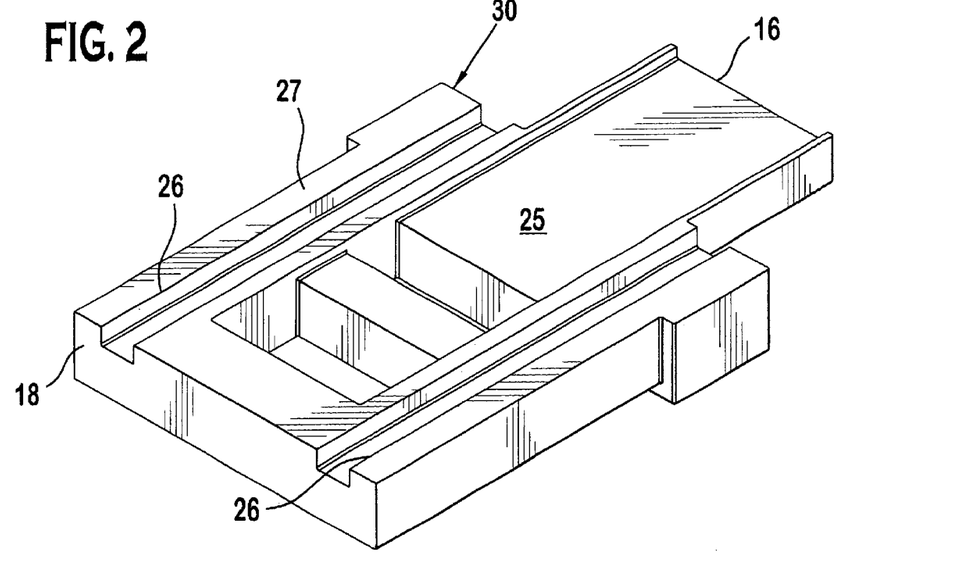
FIG. 2 is a perspective view of a blank of a fiber ferrule half.
Figure 3:
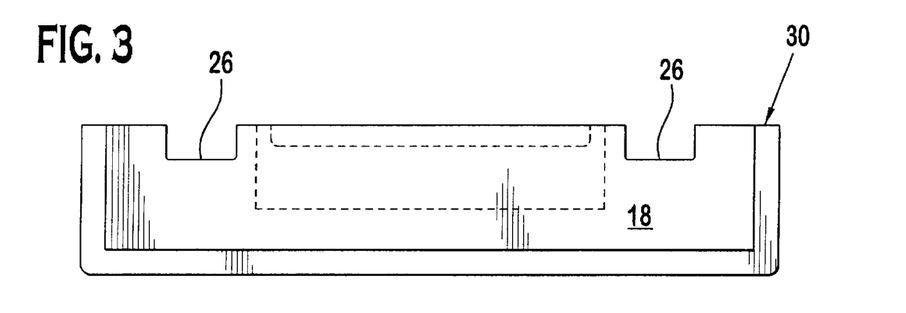
FIG. 3 is an end view of the fiber ferrule half of FIG. 2.

Referring now to FIG. 2, the first ferrule half 12 is formed from a ferrule half blank 30 which is either molded or cast to have preformed contoured features along an inner surface 27 of near final dimensions leaving a small amount of the material to be removed by machining. These features include a pair of pin receiving channels 26 extending from the mating face 18 rearward toward the cable receiving end 16. A plurality of fiber receiving channels 28 are also formed along the inner surface 27 near the mating face 18 and extend parallel to and in between the pin receiving channels 26. The fiber receiving channels 28 are preferably rectangular to result in six points of contact with a fiber while allowing space for epoxy of other encapsulant as will be described below. A cable receiving channel 25 extends rearward from the fiber receiving channels 28 toward the cable receiving end 16. It should be understood that both the contoured features on the inner surface 27 and the outer surface of the blank 30 may vary in shape. For example, a circular or other outer shape may be utilized, or an inner contour having a single or a plurality of channels may be formed on the contoured features depending on the needs of the end use.

Figure 4:
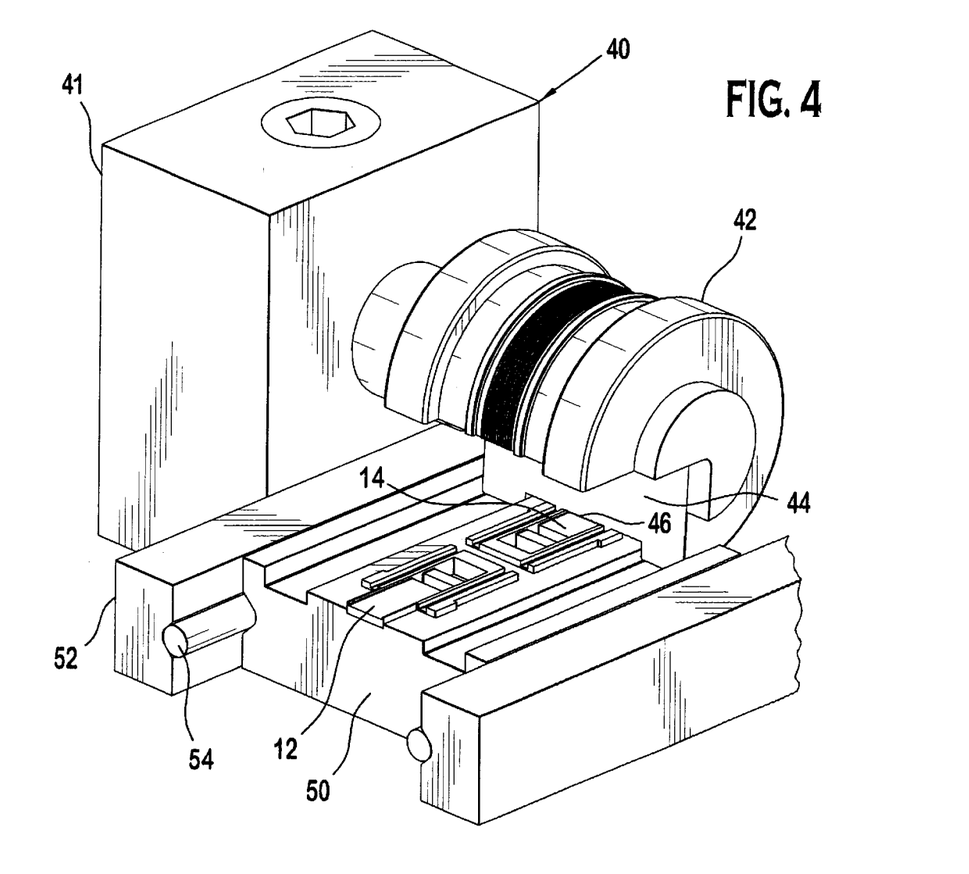
FIG. 4 is a perspective view of a machine having a broach, a carrier assembly and a pair of ferrule halves being machined therein.
Figure 8:
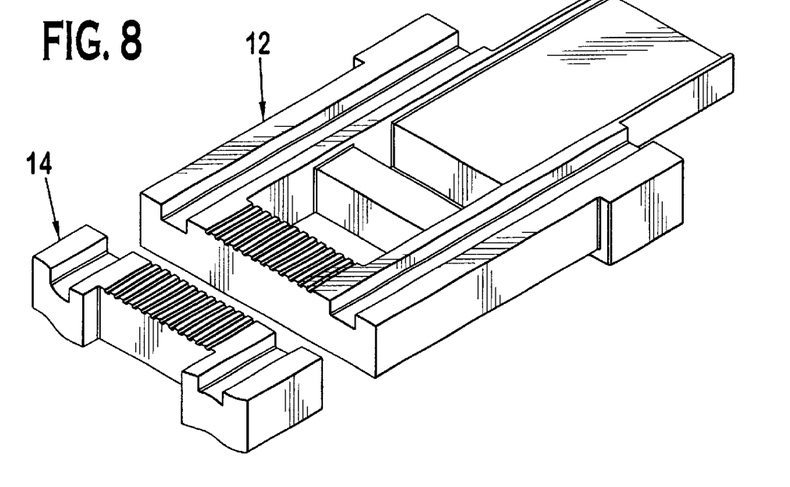
FIG. 8 is a partial exploded perspective view of the fiber ferrule halves shown in FIG. 4.
Figure 10:
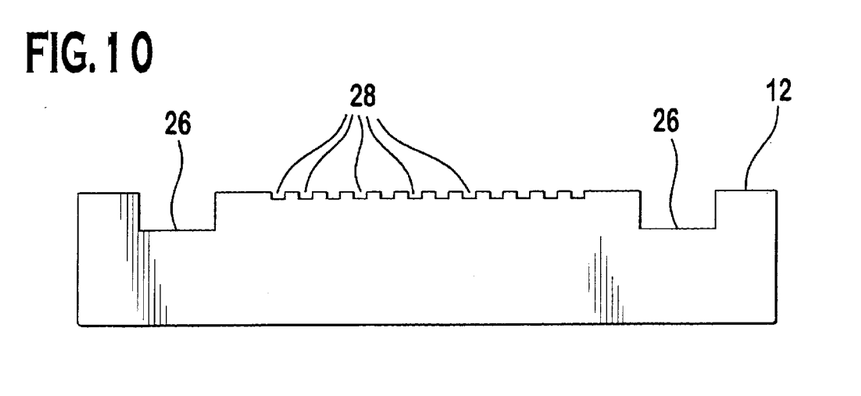
FIG. 10 is a front end view of the fiber ferrule half of FIG. 2 after the cutting operation.

Referring to FIG. 4, a machine 40 for forming the first and second ferrule halves 12, 14 from ferrule half blanks 30 is shown in FIG. 4. This machine 40 includes a cutting tool 41 having a broach 42 and a carrier 50. The broach 42 is a generally cylindrical tool having a cut out portion 44 with a cutting surface 46 along an edge thereof. Alternatively, a single linear broach can be used. This cutting surface 46 is profiled to have a desired contour for the inner surface 27 of the first and second ferrule halves 12, 14. The carrier 50 is designed to hold the blanks 30 and to slide under the broach 42 along a pair of rails 54 fixed to a frame 52. A row of ferrule half blanks 30 are placed in the carrier 50 end to end in precise alignment and then are cut by the cutting surface 46 as the carrier 50 is moved under the broach 42. All inner surfaces are cut simultaneously and the machining tool in a single pass. FIG. 8 shows an exploded view of the ferrule half blanks 30 placed end to end as they are positioned in the carrier. It should be understood that the cutting surface 46 may be profiled to create semi-circular, rectangular, square, triangular, or any other geometry for each of the fiber receiving channels 28 and pin receiving channels 26. For example, as best shown in FIG. 10, the first ferrule half 12 has been cut to have generally square fiber receiving channels 28 and generally rectangular pin receiving channels 26. This geometry is preferred because it results in 6 points of contact with each fiber and pin to assure greater positional accuracy.

Figure 9:
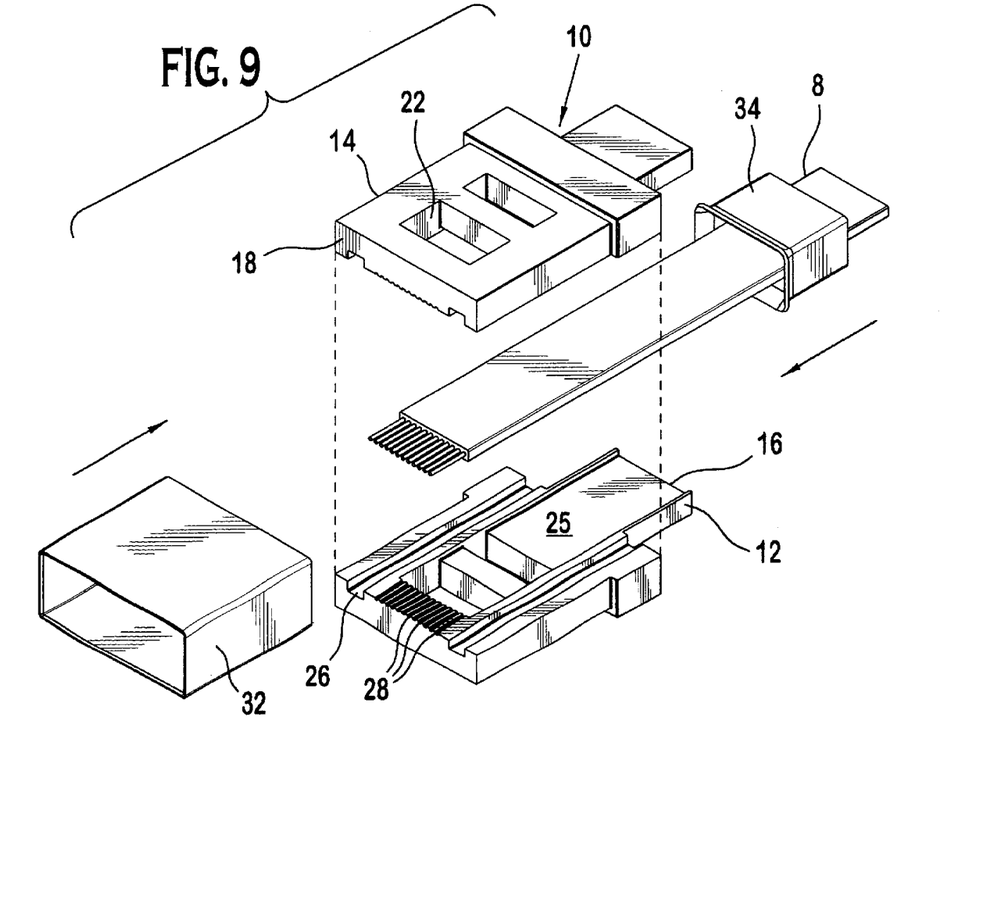
FIG. 9 is an exploded perspective view of the fiber ferrule assembly of FIG. 1 having sleeves attached over the front and rear ends thereof.

Once the first and second ferrule halves 12, 14 have been machined and properly formed, the ferrule 10 is assembled to a ribbon fiber cable 8 as best shown in FIG. 9. The ribbon fiber cable 8 is first stripped to expose the individual fiber ends as is well known in the art. The exposed fibers are then dipped into epoxy or other suitable adhesives or encapsulant materials. The ribbon fiber cable 8 is placed into the first ferrule half 12 such that each of the individual fibers resides in a respective fiber receiving channel 28 and the remainder of the ribbon fiber 8 fits into the cable receiving channel 26 and exits the cable receiving end 16. The fiber receiving channels 28 engage each inserted fiber at three points and have space in the corners for receiving the epoxy or encapsulant. The second ferrule half 14 is then placed over the ribbon fiber 8 and joined to the first ferrule half 12. Again, the fiber contacts each channel 28 of the second half 14 at three points and epoxy is received in the channel's corner spaces. The result is that each fiber is secured in a respective fiber receiving passageway 20 by six points of contact and epoxy in the spaces in the corners around the contact points. Epoxy or encapsulant is then applied through the windows 22 as is well known in the art for securing a ribbon cable 8 into a ferrule 10. It should be understood that the first and second ferrule halves 12, 14 may be joined to each other by any suitable means such as ultrasonic welding, adhesives, or mechanical fasteners. A front sleeve 32 is preferably placed over the ferrule 10 from the mating face 18 and a rear sleeve 34 is placed over the ferrule 10 from the cable receiving end 16 as indicated by the arrows in FIG. 6. Metal sleeves (not shown) may be inserted in the pin receiving channels 24 to surround the pins. The mating face is then polished according to techniques known in the art.

Figure 5:
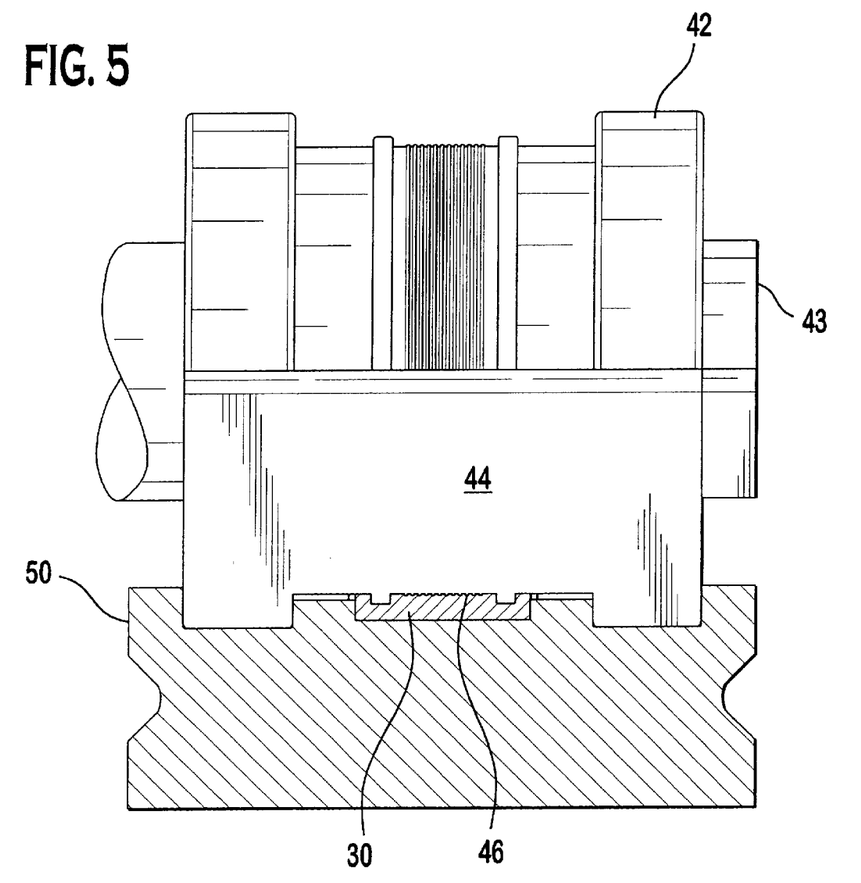
FIG. 5 is an end view of the broach of FIG. 4.

Referring now to FIG. 5, the broach 42 is shown in greater detail. The broach is preferably monolithic and is generally a cylindrical component having a cut out portion 44. The broach 42 preferably has an integral shaft 43 extending therefrom. Alternatively, the broach 42 may be mounted to the shaft 43. A cutting surface 46 extends from the cut out portion 44. The profile of the cutting surface 46 extends around the circumference of the broach 42. It should be understood that when the cutting surface 46 is dull, the cut out portion 44 may be machined to expose a new sharp cutting surface having the desired profile. The broach 42 may then be rotated about the shaft 43 to be in an appropriate cutting position over the carrier 50.

Figure 6:
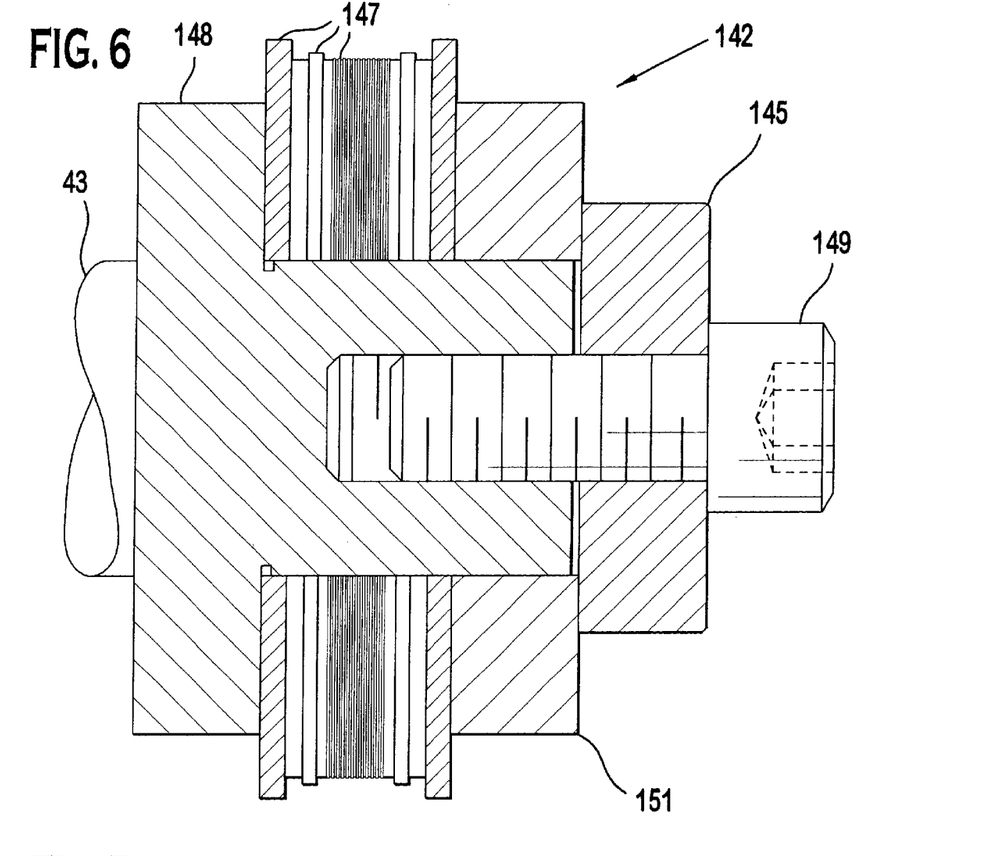
FIG. 6 is a cross sectional view of an alternate broach.
Figure 7:
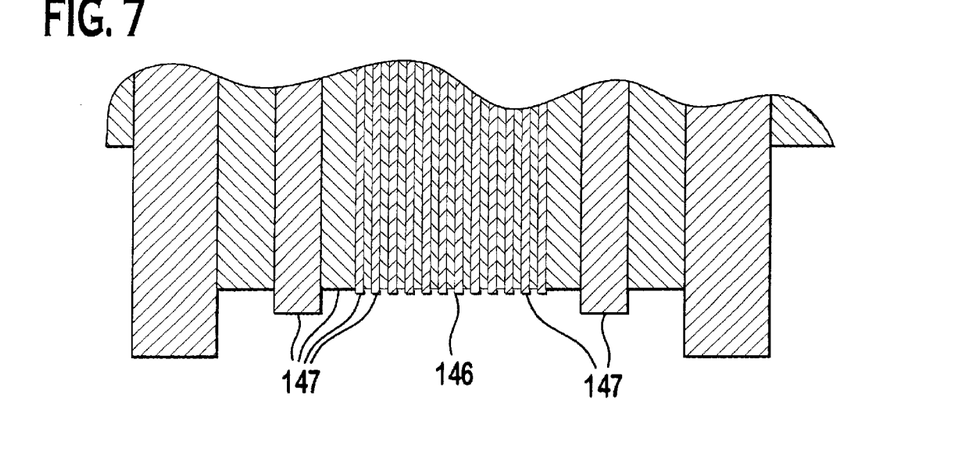
FIG. 7 is a partial exploded cross sectional view of the broach of FIG. 6.

Referring now to FIGS. 6 and 7 an alternate broach 142 is shown. The alternate broach 142 is fixed to a shaft 43 by a plate 145 which is secured to the shaft 43 by a bolt 149 or other suitable fastener. The broach 142 has a spindle 148 around which a series of plates 147 are applied. As best shown in the exploded view of FIG. 7, the series of plates 147 are held together on this spindle 148 by the plates 145, 151. The plates 147 are appropriately dimensioned to form the cutting surface 146. Once again, a cut out portion is provided around the broach 142 and the cut out portion surface may be machined in order to sharpen the tool as was described above.

Figure 11:
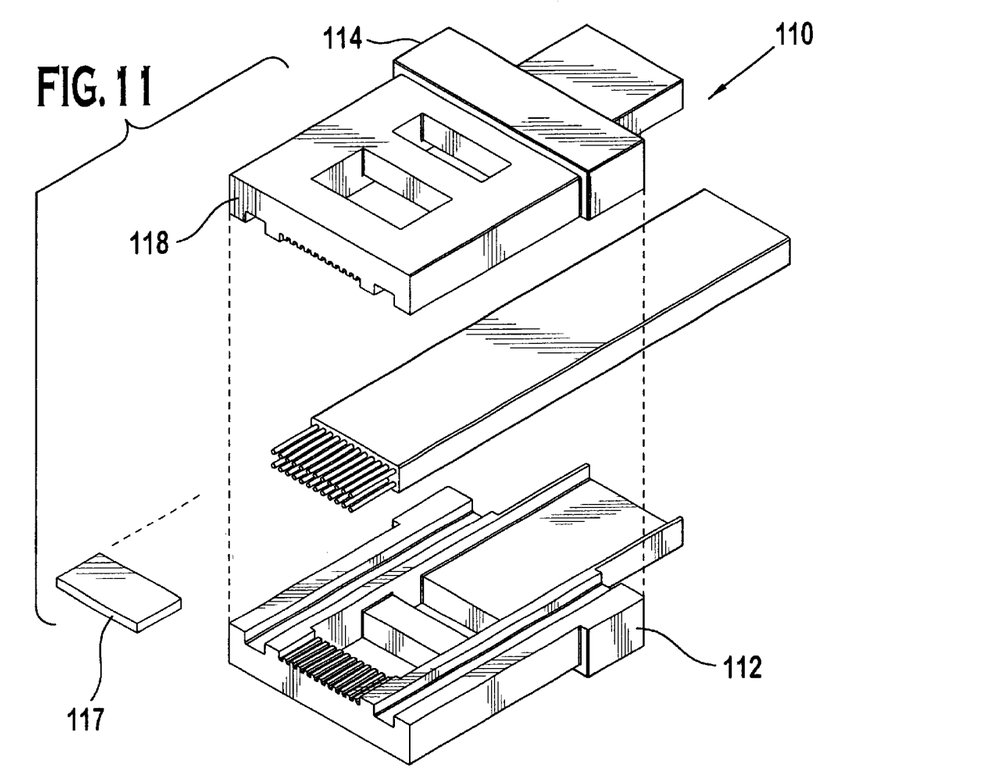
FIG. 11 is an exploded perspective view of an alternate multi fiber ferrule.
Figure 12:
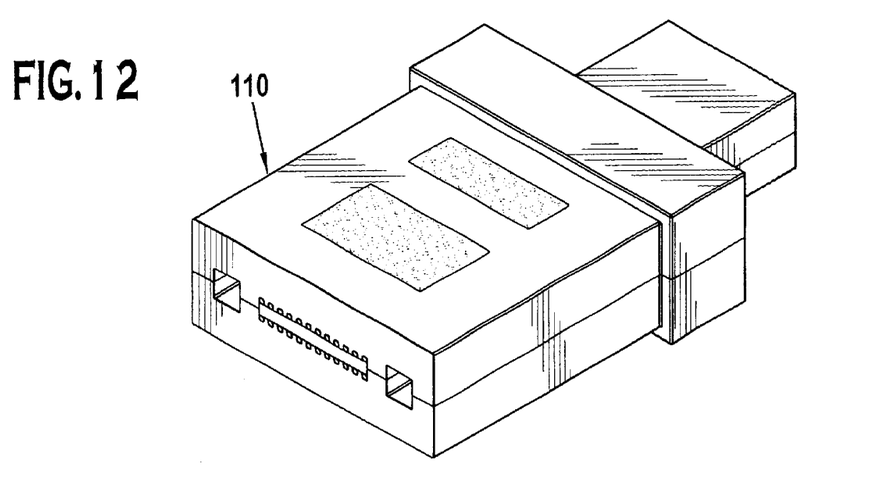
FIG. 12 is a perspective view of the alternate multi fiber ferrule of FIG. 11.
Figure 13:
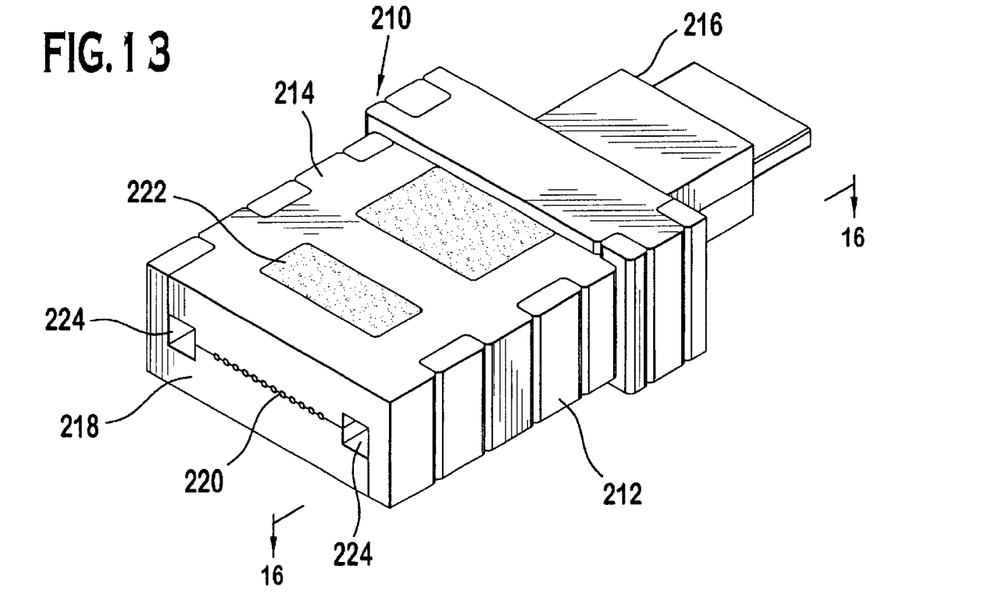
FIG. 13 is a perspective view of yet another alternate embodiment of the multi fiber ferrule according to the invention.

Referring now to FIG. 11, an alternate ferrule 110 is shown. This alternate ferrule 110 is designed to hold two rows of fibers either included in a single ribbon or in a pair of ribbons. The machining process and method of making each of the alternate first and second ferrule halves 112, 114 is the same as that described above. In this embodiment, however, an intermediate member 117 is inserted between the stripped fibers at the mating face 118 to form the assembly shown in FIG. 12. It should be understood that multi-row arrays with more than two rows may be formed utilizing these principles and having additional intermediate members 117. The ferrule halves would be similarly machined however and adjusted in dimensions in order to accommodate the greater thickness ribbon fiber cables.

Yet another alternate multi fiber ferrule 210 is shown in FIGS. 13–16. This ferrule 210 also consists of first and second ferrule halves 212, 214. Each of these first and second ferrule 19 halves 212, 214 are hermaphroditic therefore only the first half 212 will be described in greater detail. The ferrule 210 similarly has a cable receiving end 216, a mating face 218, and windows 222. A plurality of fiber receiving passageways 220 are similarly organized in a linear array between a pair of pin receiving passageways 224 along the mating face 218.

Figure 14:
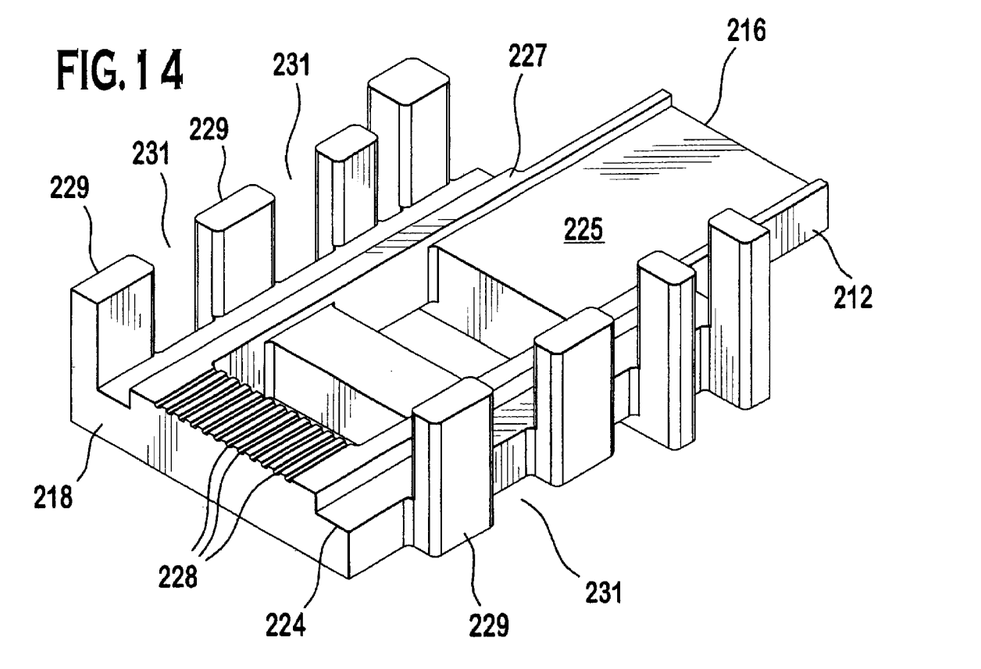
FIG. 14 is a perspective view of a fiber ferrule half for the alternate ferrule of FIG. 13.

Ferrule half 212 is made utilizing the machine 40 and process as was described above. Referring now to FIG. 14, a cable receiving channel 225 extends forward from the cable receiving end 216 to the fiber receiving channels 228 located near the mating face 218. The pin receiving channels 226 extend from the mating face 218 toward the cable receiving end around the array of fiber receiving channels 228. Each of these features is similar to those of the previous embodiments, however, this ferrule half 212 further includes a plurality of interlocking fingers 229 extending perpendicular to the inner surface 227. A plurality of finger receiving spaces 231 are positioned between of each of the fingers 229.

Figure 15:
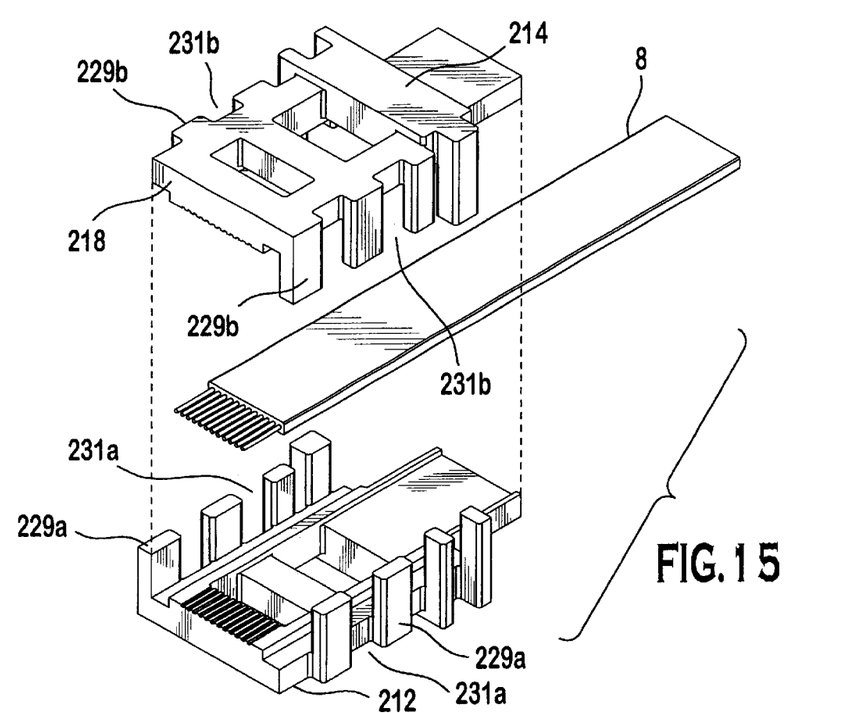
FIG. 15 is an exploded perspective view of the alternate multi fiber ferrule of FIG. 13.
Figure 16:
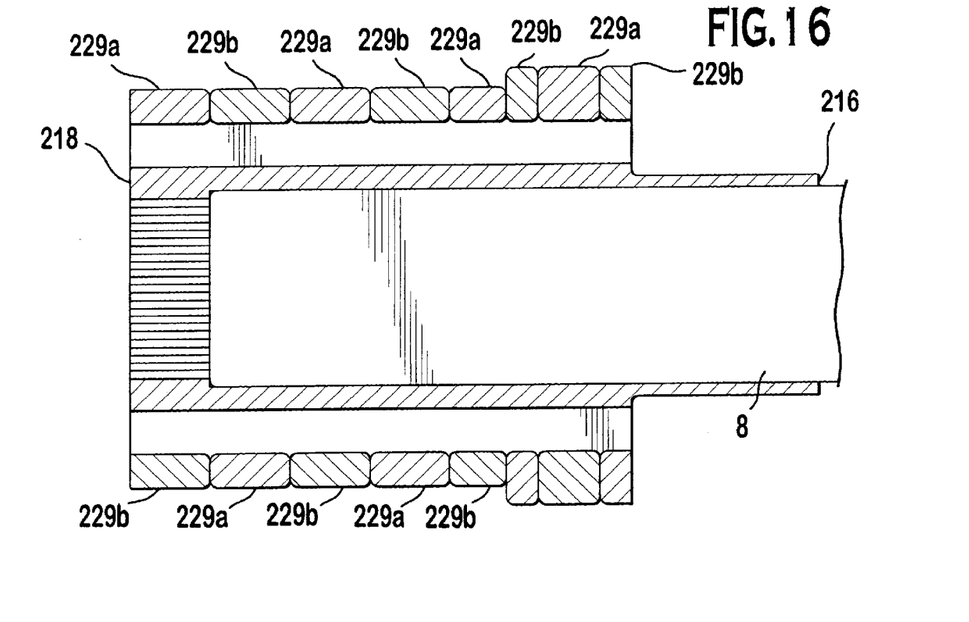
FIG. 16 is a cross sectional view of the alternate multi fiber ferrule of FIG. 15.

As best shown in FIGS. 15 and 16, in assembly, the first and second hermaphroditic ferrule halves 212, 214 are pressed together with the pre-stripped ribbon cable 8 inserted therebetween. In FIGS. 15 and 16, the fingers of the first ferrule half 212 will be referred to by number 229a and the fingers of the second ferrule half 214 will be referred to by number 229b for clarity. Similarly, the finger receiving spaces of the first ferrule half 212 will be referred to by number 231a and, the finger receiving spaces of the second ferrule half 214 will be referred to by number 231b. The fingers 229a of the first ferrule half 212 form an interference fit between the finger receiving spaces 231b of the second ferrule half 214. This fit is preferably achieved by forming the halves 212, 214 of a stable metal such as a zinc alloy. It should be understood, however, that other suitable plastics or other stable materials could be used. This eliminates the need for sleeves or other methods to secure the ferrule halves together. An advantage of this embodiment is that the need for mechanical devices or adhesives to fix the ferrule halves 212, 214 together is eliminated.

It should also be understood that in this and the previous embodiments, the channels 224, 228 in each half 212, 214 are aligned with each other by placement of a fiber or pin therein. The fingers are dimensioned with some small lateral clearance to allow this alignment of the channels 226, 228.

An advantage of the present invention is that ferrule halves may be precisely machined in order to reduce positional tolerance and increase accuracy between pins and an array of fibers along a mating face of the ferrule. Additionally, the ferrule may be made of imprecisely molded or cast blanks which are precisely cut using the broach and method described above. The broach is a simple tool which is easily sharpened by removing material along the cutting edge of the tool. The cutting process is simplified by placing multiples of ferrule halves on a carrier that pass under cutter in an end to end relationship thereby assuring precisely aligned cuts in all ferrule halves. Since all halves are cut with the same tool, positional tolerance between adjacent channels is maintained. An additional advantage of the ferrule is that each fiber is placed in the ferrule such that it contacts a respective passageway in six locations while having a space within each passageway extending along the fiber for receiving epoxy or encapsulant. This serves to firmly support the fibers in the ferrule and prevent them from pistoning within the passageway.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A multi fiber ferrule for use in an optical connector comprising:
    a first ferrule half having a contour formed on an inner surface thereof, the contour including a plurality of rectangular shaped channels each for receiving a respective fiber, each rectangular shaped channel contacting the respective fiber at three locations;
    a second ferrule half having a complimentary contour formed on an inner surface thereof, the contour including a plurality of rectangular shaped channels each for receiving a respective fiber, each rectangular shaped channel contacting the respective fiber at three locations;
    a first window formed in the first ferrule half extending from the inner surface to an outer surface;
    a second window formed in the second ferrule half extending from the inner surface to an outer surface;
    an encapsulant disposed in a space between the respective fiber and a corner of the channel of each of the first and second ferrule halves; and
    a joining means for securing the first and second ferrule halves together over a multi fiber cable.

2. The multi fiber ferrule as recited in claim 1 wherein the encapsulant extends along the respective fiber substantially covering a portion of the fiber that is stripped.

3. The multi fiber ferrule as recited in claim 1 wherein an encapsulant is applied through the windows.

4. The multi fiber ferrule as recited in claim 1 wherein the contour of the first ferrule half includes a plurality of rectangular channels for receiving a guide pin, and the contour of the second ferrule half includes a plurality of rectangular channels for receiving a guide pin.

5. The multi fiber ferrule as recited in claim 4, wherein the rectangular channels for receiving guide pins each contacts a respective guide pin at three locations.

6. The multi fiber ferrule as recited in claim 1 further comprising an outer sleeve surrounding the first and second fiber halves.

7. The multi fiber ferrule as recited in claim 1 wherein the ferrule halves are made of metal.

8. The A multi fiber ferrule for use in an optical connector comprising:
    a first ferrule half having a contour formed on an inner surface thereof, the contour including a plurality of rectangular channels each for receiving a guide pin;
    a second ferrule half having a complimentary contour formed on an inner surface thereof, the contour including a plurality of rectangular channels each for receiving a guide pin;
    a first window formed in the first ferrule half extending from the inner surface to an outer surface;
    a second window formed in the second ferrule half extending from the inner surface to an outer surface; and
    a joining means for securing the first and second ferrule halves together over a multi fiber cable.

9. The multi fiber ferrule as recited in claim 8 wherein the rectangular channels for receiving guide pins each contacts a respective guide pin at three locations.

10. The multi fiber ferrule as recited in claim 8 wherein an encapsulant is applied through the windows.

11. The multi fiber ferrule as recited in claim 8 further comprising an outer sleeve surrounding the first and second fiber halves.

12. The multi fiber ferrule as recited in claim 8 wherein the ferrule halves are made of metal.

13. A multi fiber ferrule for use in an optical connector comprising:
   a first ferrule half having a contour formed on an inner surface thereof;
   a second ferrule half having a complimentary contour formed on an inner surface thereof;
   a first window formed in the first ferrule half extending from the inner surface to an outer surface;
   a second window formed in the second ferrule half extending from the inner surface to an outer surface;
   a first plurality of fingers extending from side edges of the first ferrule half beyond the inner surface; and
   a second plurality of fingers extending from side edges of the second ferrule half extending beyond the inner surface.

14. The multi fiber ferrule according to claim 13 wherein the fingers of the first ferrule half fit into respective spaces in the second ferrule half.

15. The multi fiber ferrule as recited in claim 14 wherein the respective spaces are positioned between the fingers.

16. The multi fiber ferrule according to claim 14 wherein the first and second ferrule halves are hermaphroditic.

17. The multi fiber ferrule as recited in claim 13 wherein the contour of the first ferrule half includes a plurality of rectangular shaped channels each for receiving a fiber therein, and the contour of the second ferrule half includes a plurality of rectangular shaped channels each for receiving a fiber therein.

18. The multi fiber ferrule as recited in claim 17 wherein each rectangular shaped channel for receiving a fiber contacts a respective fiber at three locations.

19. The multi fiber ferrule as recited in claim 13 wherein the contour of the first ferrule half includes a plurality of rectangular shaped channels each for receiving a guide pin therein, and the contour of the second ferrule half includes a plurality of rectangular shaped channels each for receiving a guide pin therein.

20. The multi fiber ferrule as recited in claim 19 wherein each rectangular shaped channel for receiving a guide pin contacts a respective guide pin at three locations.

21. The multi fiber ferrule as recited in claim 13 wherein the ferrule halves are made of metal.

22. A multi fiber ferrule for use in an optical connector comprising:
   a first ferrule half having a contour formed on an inner surface thereof;
   a second ferrule half having a complimentary contour formed on an inner surface thereof;
   a first window formed in the first ferrule half extending from the inner surface to an outer surface;
   a second window formed in the second ferrule half extending from the inner surface to an outer surface;
   a joining means for securing the first and second ferrule halves together over a multi fiber cable wherein the joining means is an outer sleeve surrounding the first and second ferrule halves; and
   the first and second ferrule halves are hermaphroditic.

23. The multi fiber ferrule as recited in claim 22 wherein the contour of the first ferrule half includes a plurality of rectangular shaped channels each for receiving a fiber therein, and the contour of the second ferrule half includes a plurality of rectangular shaped channels each for receiving a fiber therein.

24. The multi fiber ferrule as recited in claim 23 wherein each rectangular shaped channel for receiving a fiber contacts a respective fiber at three locations.

25. The multi fiber ferrule as recited in claim 24 wherein an encapsulant is disposed in a space between the respective fiber and a corner of the channel.

26. The multi fiber ferrule as recited in claim 25 wherein the encapsulant extends along the respective fiber substantially covering a portion of the fiber that is stripped.

27. The multi fiber ferrule as recited in claim 22 wherein the contour of the first ferrule half includes a plurality of rectangular shaped channels each for receiving a guide pin therein, and the contour of the second ferrule half includes a plurality of rectangular shaped channels each for receiving a guide pin therein.

28. The multi fiber ferrule as recited in claim 27 wherein each rectangular shaped channel for receiving a guide pin contacts a respective guide pin at three locations.

29. The multi fiber ferrule as recited in claim 22 wherein the ferrule halves are made of metal.

30. A method of making an optical termination comprising the steps of:
   providing a stripped multi fiber cable having a plurality of fibers exposed for termination;
   machining along an inner surface of a blank to form a first fiber ferrule half;
   machining along an inner surface of a blank to form a second fiber ferrule half;
   dipping the stripped multi fiber cable in epoxy;
   placing the stripped multi fiber cable between the fiber ferrule halves; and
   positioning the fiber ferrule halves together around the cable; and
   applying an outer sleeve around the fiber ferrule halves to secure them to each other.

31. The method of making an optical termination as recited in claim 30 wherein the step of machining along the inner surface of a blank to form a first fiber ferrule half includes forming a first plurality of rectangular shaped channels each for receiving a respective fiber therein, and that machining along the inner surface of a blank to form a second fiber ferrule half includes forming a second plurality of rectangular shaped channels each for receiving a respective fiber therein.

32. The method of making an optical termination as recited in claim 31 wherein the step of positioning the fiber ferrule halves together includes engaging each fiber receiving channel and respective stripped fiber at three points of contact.

33. The method of making an optical termination as recited in claim 30 wherein the step of machining along the inner surface of a blank to form a first fiber ferrule half includes forming a first plurality of rectangular shaped channels each for receiving a respective guide pin therein, and that machining along the inner surface of a blank to form a second fiber ferrule half includes forming a second plurality of rectangular shaped channels each for receiving a respective guide pin therein.

34. The method of making an optical termination as recited in claim 30 further comprising the step of injecting epoxy into a window of each fiber ferrule half.

35. The multi fiber ferrule as recited in claim 30 wherein the ferrule halves are made of metal.

36. A method of making an optical termination comprising the steps of:
   providing a stripped multi fiber cable having a plurality of fibers exposed for termination;

machining along an inner surface of a blank to form a first fiber ferrule half;

machining along an inner surface of a blank to form a second fiber ferrule half;

placing the ribbon cable between the fiber ferrule halves;

positioning the fiber ferrule halves together around the cable;

injecting epoxy into a window of each fiber ferrule half; and applying an outer sleeve around the fiber ferrule halves to secure them to each other.

37. The method of making an optical termination as recited in claim 36 wherein the step of machining along the inner surface of a blank to form a first fiber ferrule half includes forming a first plurality of rectangular shaped channels each for receiving a respective fiber therein, and that machining along the inner surface of a blank to form a second fiber ferrule half includes forming a second plurality of rectangular shaped channels each for receiving a respective fiber therein.

38. The method of making an optical termination as recited in claim 37 wherein the step of positioning the fiber ferrule halves together includes engaging each fiber receiving channel and respective stripped fiber at three points of contact.

39. The method of making an optical termination as recited in claim 36 wherein the step of machining along the inner surface of a blank to form a first fiber ferrule half includes forming a first plurality of rectangular shaped channels each for receiving a respective guide pin therein, and that machining along the inner surface of a blank to form a second fiber ferrule half includes forming a second plurality of rectangular shaped channels each for receiving a respective guide pin therein.

40. The multi fiber ferrule as recited in claim 36 wherein the ferrule halves are made of metal.

* * * * *

UNITED STATES PATENT AND TRADEMARK OFFICE
CERTIFICATE OF CORRECTION

PATENT NO. : 6,695,488 B2
DATED : February 24, 2004
INVENTOR(S) : Dimitri G. Grabbe It is certified that error appears in the above-identified patent and that said Letters Patent is hereby corrected as shown below:

Column 6,
Line 43, "The A multi" should read -- A multi --.

Signed and Sealed this

Twenty-eighth Day of December, 2004

JON W. DUDAS
*Director of the United States Patent and Trademark Office*